United States Patent [19]

Ewald et al.

[11] 3,880,263
[45] Apr. 29, 1975

[54] SURGE BRAKE ACTUATOR

[75] Inventors: Jerome T. Ewald; Walter J. Mizen, both of South Bend, Ind.

[73] Assignee: The Bendix Corporation, South Bend, Ind.

[22] Filed: Oct. 23, 1973

[21] Appl. No.: 408,877

[52] U.S. Cl............................. 188/112; 188/142
[51] Int. Cl............................................. B60t 7/20
[58] Field of Search ............ 188/142, 112; 280/428

[56] References Cited
UNITED STATES PATENTS

| | | | |
|---|---|---|---|
| 2,149,189 | 2/1939 | Shaffer | 188/112 |
| 3,144,101 | 8/1964 | Hahn | 188/142 X |
| 3,168,940 | 2/1965 | Ross et al. | 188/112 |
| 3,647,032 | 3/1972 | Dombeck | 188/112 |
| 3,768,606 | 10/1973 | Mizen et al. | 188/112 |

FOREIGN PATENTS OR APPLICATIONS

| | | | |
|---|---|---|---|
| 73,660 | 1/1952 | Denmark | 188/112 |
| 702,411 | 1/1965 | Canada | 188/112 |
| 1,172,810 | 12/1969 | United Kingdom | 188/112 |

*Primary Examiner*—George E. A. Halvosa
*Attorney, Agent, or Firm*—Leo H. McCormick, Jr.; William N. Antonis

[57] ABSTRACT

A control apparatus for activating the wheel brakes of a trailer in response to a deceleration force from a tow vehicle exerted through a resilient coupling. The resilient coupling is surrounded by first and second telescoping members to maintain the deceleration force from the tow vehicle in direct axial alignment with a pressure producing device. A force absorbing device located between the first and second telescoping members will attenuate the oscillatory movement caused by road conditions from inadvertently establishing a momentary deceleration force through the resilient coupling.

10 Claims, 4 Drawing Figures

SURGE BRAKE ACTUATOR

BACKGROUND OF THE INVENTION

Surge brake actuators for operating the wheel brakes of a trailer being moved by a tow vehicle have been accepted by industry and the public since no physical connection exists with the wheel brakes in the tow vehicle. The trailer brake pressure is modulated by and directly dependent upon the input force transmitted through the ball-tongue coupling. This input force is sufficient to synchronize the actuation of the brakes of the tow vehicle-trailer and bring the combination to a uniform stop.

In U.S. Pat. No. 3,768,606 incorporated herein by reference, there is disclosed a surge braking system showing the typical under/over hitch and tongue arrangement wherein an operational force is transmitted through a lever arrangement to operate the master cylinder in the trailer. In such a device the lever arrangement requires sufficient space for mounting the trailer, an item which is not found on all models.

In U.S. Pat. No. 3,647,032, incorporated herein by reference, a compact surge brake actuator is disclosed wherein the operational input developed by deceleration is transmitted through a shock absorber to activate a master cylinder. However, over an extended period of time some shock absorbers tend to lose prime because they are located in the horizontal position. When the shock absorbers lose fluid, a non-uniform actuation force is created resulting in extreme cases, in no brakes in the trailer.

SUMMARY OF THE INVENTION

We have developed a control for a surge brake system wherein an actuational input is transmitted directly through a resilient means as dampened by a pressure absorbing means to operate a pressure producing means. A pair of telescoping members retain the resilient means in axial alignment with the pressure producing means when an actuation input is developed through a deceleration in the tow vehicle independently of the trailer.

In addition a bypass means is connected to the pressure producing means to avoid pressure build up which otherwise develops when the tow vehicle moves the trailer in a reverse direction. Further, a breakaway actuator is connected to the tow vehicle and the trailer to immediately supply a constant force on the pressure producing means upon separation of the tow vehicle from the trailer and thereby lock the wheel brakes on the trailer in a braking condition.

It is therefore the object of this invention to provide a control device for uniformly actuating a surge braking system in a trailer proportional to the actuation of the braking system of the tow vehicle.

It is another object of this invention to provide a surge braking system with a control device surrounded by telescoping members that move axially when a deceleration occurs between a tow vehicle and a trailer to permit a resilient means to directly supply a pressure producing means with an operational input.

It is still a further object of this invention to provide a control device for a surge brake system with a bypass control to permit the tow vehicle to push a trailer in the reverse direction without actuation of the wheel brakes of the trailer.

It is still a further object of this invention to provide a surge brake system with a breakaway actuation means to immediately apply a constant force of a pressure producing means upon separation of a tow vehicle from a trailer.

These and other objects will become apparent from reading this specification and viewing the drawings.

DETAILED DESCRIPTION OF THE PREFERRED EMBODIMENT

Figure 1:
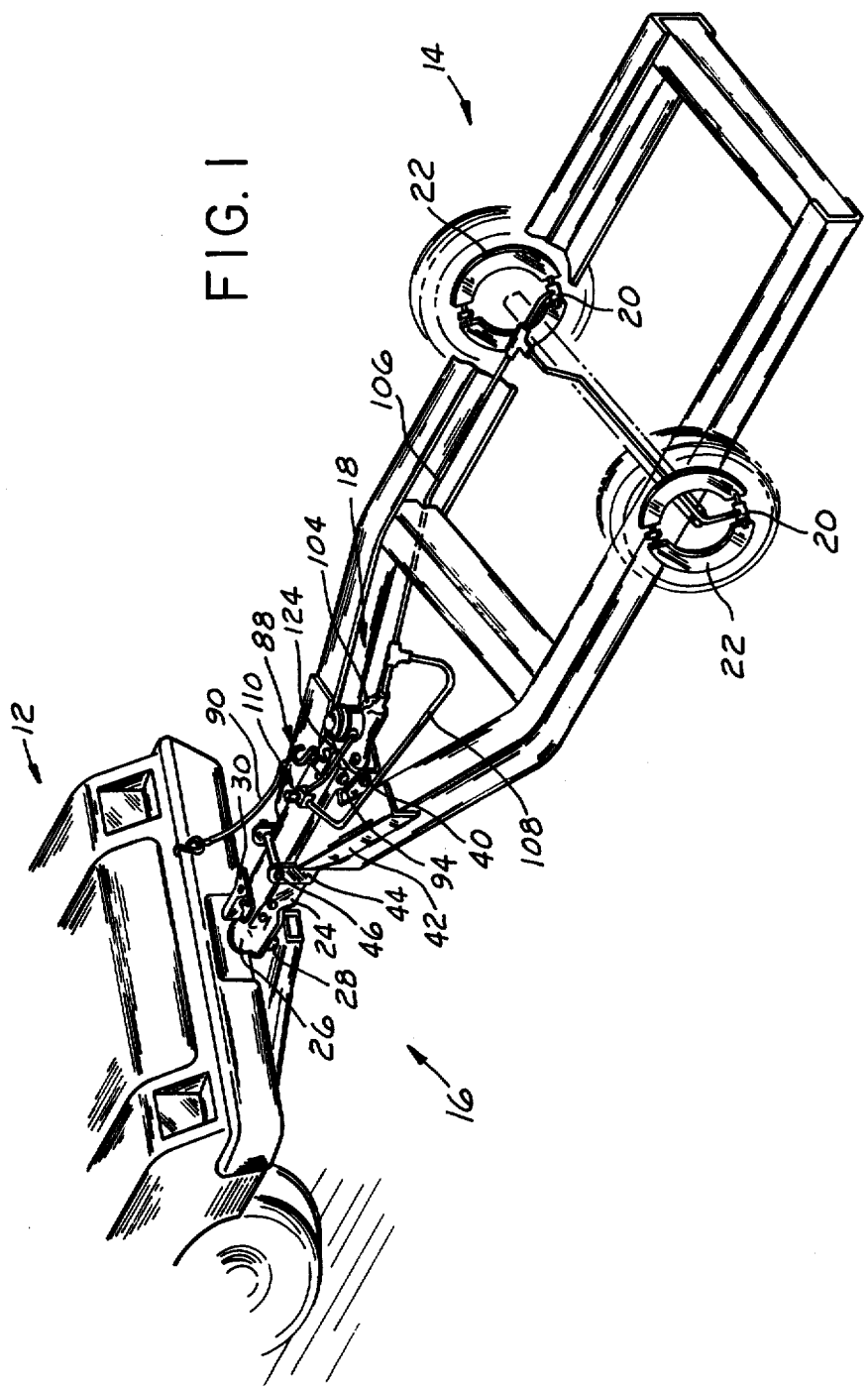
FIG. 1 is a schematic illustration of a tow vehicle-trailer having a surge brake actuator thereon made in accordance with this invention.

As shown in FIG. 1 a tow vehicle 12 is connected to trailer 14 by hitch means 16. The hitch means 16 has incorporated therein a surge brake means 18 which will supply cylinders 20 of the wheel brakes 22 on the trailer 14 with fluid under pressure when the tow vehicle 12 decelerates initially at a faster rate than the trailer 14. With the trailer brakes receiving the fluid under pressure, the proportioned rate of deceleration between the tow vehicle and the trailer can be synchronized.

Figure 2:
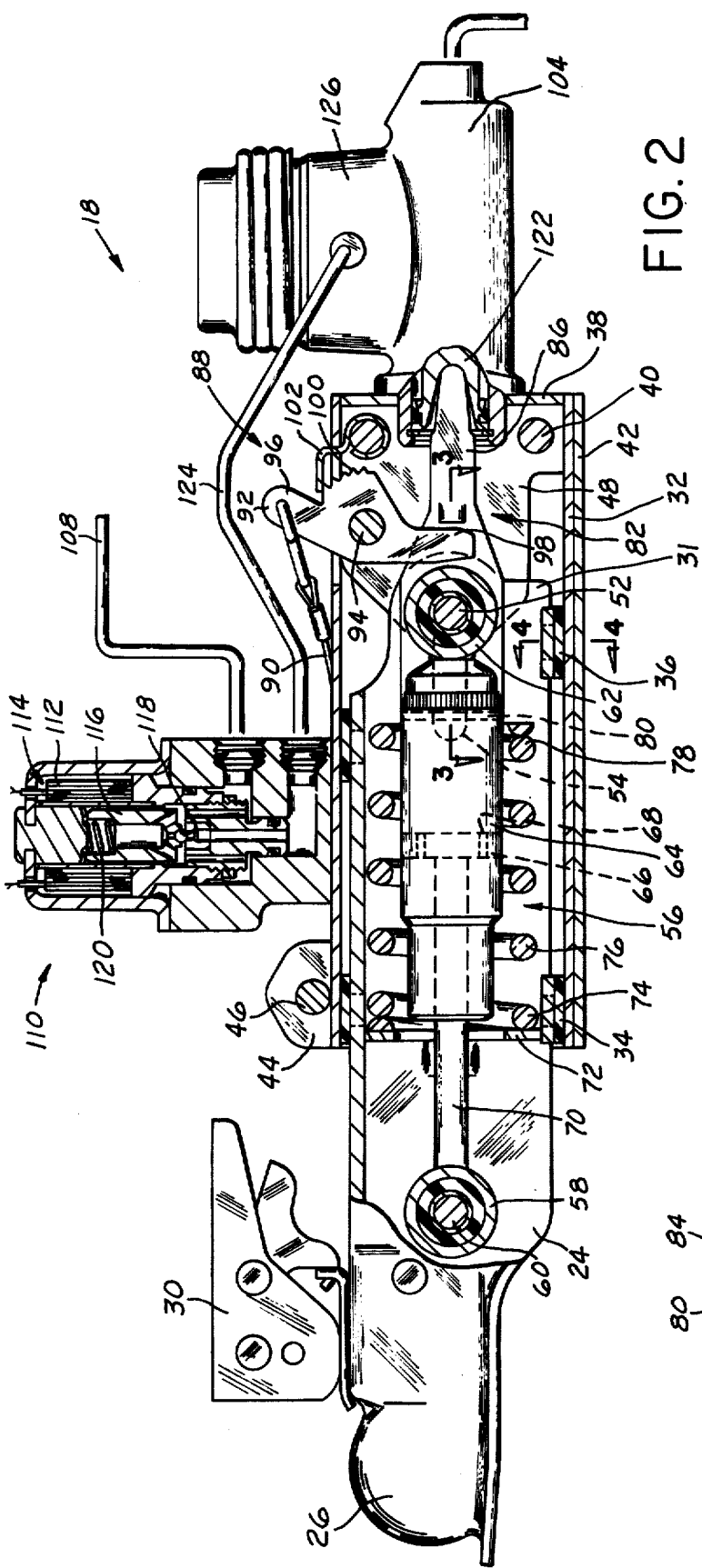
FIG. 2 is a sectional view showing the telescoping members surrounding the resilient actuator in a release position.
Figure 4:
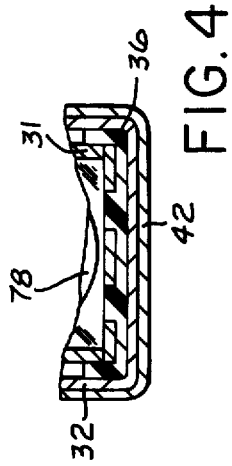
FIG. 4 is a sectional view taken along lines 4—4 of FIG. 2.

The surge brake means 18 is shown in more detail in FIG. 2 wherein a first telescoping member 24 has a cup 26 on one end thereof for receiving the ball 28 on the tow vehicle. A well known safety lock 30 fixes the cup 26 on the ball 28 to prevent unwanted separation of the tow vehicle 12 and the trailer 14. The first telescoping member 24 has a clevis-like end 31 which extends into a second telescoping member 32. The second telescoping member 32 has a pair of guides 34 and 36, see FIGS. 2 and 4 which engage the first telescoping member 32 to maintain a uniform concentric relationship therebetween. The guides 34 and 36 will absorb any side forces which may be transmitted upon the first telescoping member 24 moving in the second telescoping member 32. The second telescoping member 32 is attached to an end plate 38 and a centering shroud tongue 42 by a bolt 40. The shroud tongue 42 has a bifurcated extension 44 which surrounds the end of the second telescoping member through which bolt 46 extends to rigidly hold the second telescoping member to the trailer 14.

The end plate 38 has a pair of projections 48 and 50 which extend toward the first telescoping member. A pin 52 is located in a slotted opening 54 in the clevis-like end 31 of the first telescoping member 24 to join the first and second telescoping members together. The ends of the pin 52 engage the telescoping means 32 to prevent any end play.

A dampening means 56 has a first end 58 rigidly attached to the first telescoping means 24 by a pin 60 and a second end 62 rigidly attached and centrally located on pin 52. The dampening means 56 has a closed cylinder 64 wherein a piston 66 is located. The piston 66 has a series of restricted passageways 68 through which a fluid can flow in a controlled manner in response to movement of connecting rod 70.

The first telescoping member 24 has a shoulder 72 which is located between the clevis-like end 31 and the cup 26 for retaining one end 74 of resilient means 76. The other end 78 of the resilient means 76 is adapted to be located adjacent bracket 80 of the push rod means 82. The bracket 80 has an elongated slot 84 through which pin 52 extends to hold the shaft 86 of the push rod in axial alignment with the first and second telescoping members.

A breakaway means 88 is connected to the tow vehicle 12 by a cable 90. The breakaway means 88 has a lever arm 92 which is pivotally located on pin 94. The cable 90 is attached to one end 96 of the lever arm 92 while the other end 98 extends into alignment with shaft 86. A ratchet 100 on the lever arm 92 can engage locking tab 102 and maintain the lever arm in a stationary position upon a tensile force being applied to cable 90.

The pressure producing means 104 supplies fluid under pressure through conduit 106 to cylinder 20 of the wheel brakes 22. A bypass conduit 108 is connected to a bypass control means 110. The bypass control means 110 is connected to receive the actuation signal for the back-up light upon moving the gear shift in the tow vehicle into reverse. When the bypass control means 110 receives this signal, coil 112 of solenoid means 114 is energized causing plunger 116 to be moved away from port 118 against the opposition of spring 120. As the tow vehicle pushes the trailer in a reverse direction, the first telescoping member 24 will move the resilient means 76 into contact with bracket 80 through which an operational force is applied to the bracket 80 for moving the piston 122 in the pressure producing means 104. As piston 120 moves, a braking pressure will be supplied to conduit 106 but with port 118 opened, this fluid pressure is diverted from conduit 108 through conduit 124 into reservoir 126 in the pressure producing means 104. This will permit the trailer to be backed into any positon with relative ease.

MODE OF OPERATION OF THE PREFERRED EMBODIMENT

Figure 3:
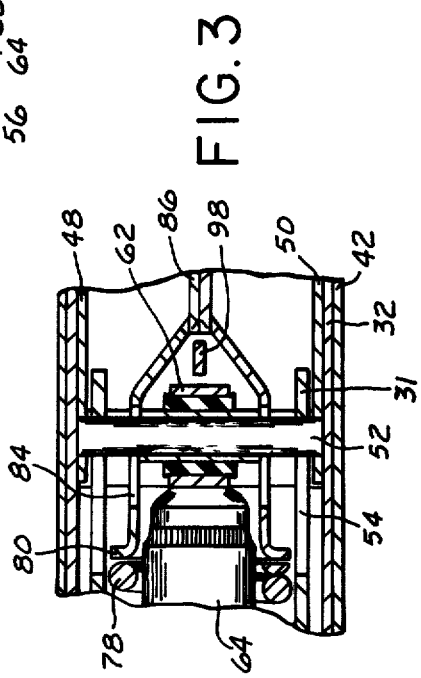
FIG. 3 is a sectional view taken along lines 3—3 of FIG. 2 showing the relationship of the resilient actuator and the dampening means with respect to an input push rod of the pressure producing means.

When the tow vehicle 12 - trailer 14 is traveling on a road at a constant speed, the pulling force will be transmitted through the first telescoping member 24 into the second telescoping member 32 through pin 52 as shown in FIG. 2 and FIG. 3. Any oscillatory forces which may develop between the tow vehicle 12 and the trailer 14 will be attenuated by the movement of piston 66 in the closed cylinder 64 as the fluid therein flows through restrictions 68. However, if the oscillatory motion is sufficient to bring the end 78 of the resilient means 76 into contact with bracket 80, a slight force will be applied to piston 122. This slight force will develop a corresponding brake force in the wheel cylinder to move the linings toward the drum.

When the operator applies the brakes of the tow vehicle 12, the trailer will move toward the tow vehicle through the sliding of the first telescoping member 24 into the second telescoping member 32.

Initial movement of the first and second telescoping members will bring end 78 of the resilient means 76 into contact with the bracket 80 upon the piston 66 moving in the closed cylinder 64. As the first telescoping member 24 moves farther into the second telescoping member 32, the resilient means will be proportionally compressed to supply an input force to push rod 86 to synchronize the actuation of the wheel brakes 22 on the trailer with those in the tow vehicle 12.

Thus, the stroke of the push rod 82 of the pressure producing means 126 can be selected by choosing the appropriate resilient means 76. Moreover, the dampening means 56 can move and be effective over the entire range of the relative movement of the first and second telescoping members. A smooth braking actuation sequence will be achieved in bringing the tow vehicle-trailer combination to a safe stop.

We claim:

1. In a control device for a tow vehicle-trailer braking system, means for activating the wheel brakes of the trailer, said means comprising:
   first and second telescoping members, said first telescoping member being attached to the tow vehicle and the second telescoping member being attached to the trailer;
   dampening means located between said first and second telescoping members for attenuating oscillatory movement therebetween without momentarily activating the wheel brakes of the trailer;
   pressure producing means fixed to one of said telescoping members for supplying said wheel brakes with an operational fluid under pressure; and
   resilient means located between the other of said telescoping members and said pressure producing means for transmitting a direct axial operational input force to the pressure producing means, the space between the other of said telescoping members and pressure producing means occupied by said resilient means being greater than the length of said resilient means when the braking system is in an unoperated condition such that the resilient means is brought into engagement with said pressure producing means and said other of the telescoping members in response to relative movement produced by a deceleration in the tow vehicle with respect to the trailer sufficient to overcome said dampening means.

2. The control device, as recited in claim 1, wherein said dampening means includes:
   a closed cylinder attached to one of said first and second telescoping members, said closed cylinder a fluid;
   a connecting rod attached to the other of said first and second telescoping members; and
   a piston secured to the connecting rod and located in the closed cylinder, said piston having a restricted passageway therethrough to permit controlled flow of the fluid within the closed cylinder when the piston and cylinder move relative to each other.

3. The control device, as recited in claim 2, wherein said first telescoping member includes:
   a first tubular member having a hitch on one end therof for engagement with the tow vehicle and a clevis on the other end, said clevis having a first arm and a second arm each of which has a slotted opening therein, said tubular member having a shoulder located between the hitch and the clevis or positioning said resilient means on the first telescoping member.

4. The control device, as recited in claim 3, wherein said second telescoping member includes:

an end plate having a first projection and a second projection extending toward said first telescoping member, said first projection having an opening therein directly opposite a similar opening in the second projection; and pin means extending from the opening in the first projection to the opening in the second projection for fixing the closed cylinder in the second telescoping member.

5. The control device, as recited in claim 4, wherein said second telescoping means further includes:

fastner means for rigidly connecting the second telescoping member and the end plate to the trailer.

6. The control device, as recited in claim 5, wherein said second telescoping means further includes:

push rod means connected to said resilient means for transmitting an operational force to the pressure producing means which is proportional to said deceleration.

7. The control device, as recited in claim 6, wherein said push rod means includes:

bracket means having a slot therein through which said pin means extends, said slot and pin means cooperating to maintain the input force from the resilient means in an axial position.

8. The control device, as recited in claim 7, wherein said first named means further includes:

bypass means connected to the pressure producing means for venting displaced fluid into a reservoir when the tow vehicle moves the trailer in a reverse direction.

9. The control device, as recited in claim 8, wherein said bypass means includes:

solenoid means activated by an operator controlled switch operating the bypass means.

10. The control device, as recited in claim 9, wherein said first named means further includes:

breakaway means connected to the tow vehicle and secured to said end plate for providing said pressure producing means with an operational input upon separation of the tow vehicle from the trailer.

* * * * *